US010089028B2

(12) United States Patent
Mishra et al.

(10) Patent No.: US 10,089,028 B2
(45) Date of Patent: Oct. 2, 2018

(54) REMOTE SECURE DRIVE DISCOVERY AND ACCESS

(71) Applicant: Dell Products L.P., Round Rock, TX (US)

(72) Inventors: Ragendra K. Mishra, Bangalore (IN); Sumanth Vidyadhara, Bangalore (IN); Chandrasekhar Puthillathe, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 187 days.

(21) Appl. No.: 15/167,208

(22) Filed: May 27, 2016

(65) Prior Publication Data

US 2017/0344294 A1     Nov. 30, 2017

(51) Int. Cl.
*G06F 3/06* (2006.01)
*G06F 21/62* (2013.01)
*G06F 21/78* (2013.01)
*G06F 13/42* (2006.01)
*G06F 13/40* (2006.01)

(52) U.S. Cl.
CPC ............ *G06F 3/0622* (2013.01); *G06F 3/067* (2013.01); *G06F 3/0659* (2013.01); *G06F 13/4022* (2013.01); *G06F 13/4282* (2013.01); *G06F 21/62* (2013.01); *G06F 21/78* (2013.01); *G06F 2213/0026* (2013.01)

(58) Field of Classification Search
CPC ...... G06F 3/062; G06F 3/0622; G06F 3/0637; G06F 3/0659; G06F 3/067; G06F 13/12; G06F 13/4022; G06F 13/4282; G06F 21/62; G06F 21/6218; G06F 21/6236; G06F 21/78
See application file for complete search history.

(56) References Cited

U.S. PATENT DOCUMENTS

| 8,266,433 B1* | 9/2012 | Przykucki ........... H04L 67/1097 380/286 |
| 2004/0107342 A1* | 6/2004 | Pham ..................... G06F 3/0622 713/165 |
| 2006/0143498 A1* | 6/2006 | Hatasaki ............. G06F 11/2025 714/6.32 |
| 2012/0047309 A1* | 2/2012 | Natu ...................... H04L 63/101 710/314 |

(Continued)

*Primary Examiner* — Thomas J Cleary
(74) *Attorney, Agent, or Firm* — Jackson Walker L.L.P.

(57) ABSTRACT

A remote secure drive access method includes receiving a first message from a second server. The message may be received by a baseboard management controller (BMC) of the first server via a PCIe switch from a second server coupled to the first server via an ExpEther connection. A payload of the message may include identification information identifying the second server. The first server may send an endpoint discover message and receive endpoint device information indicative of peripheral and/or endpoint resources of the second server, including a storage controller associated with a secure drive. Secure drive key information may be obtained from the payload of the first virtual message and sent to the second server to access the secure drive. The exchanged messages may comprise proprietary PCIe transaction layer packets enclosed within an Ethernet packet that includes an ExpEther frame within an Ethernet frame.

20 Claims, 7 Drawing Sheets

(56) References Cited

U.S. PATENT DOCUMENTS

| | | | |
|---|---|---|---|
| 2014/0250320 A1* | 9/2014 | Nyuunoya | G06F 11/2092 |
| | | | 714/4.11 |
| 2015/0074448 A1* | 3/2015 | Ageishi | G06F 11/2007 |
| | | | 714/4.11 |
| 2017/0012770 A1* | 1/2017 | Lin | G06F 21/572 |
| 2017/0083457 A1* | 3/2017 | Khennani | G06F 12/1408 |
| 2017/0085374 A1* | 3/2017 | Chen | H04L 9/0827 |
| 2017/0237563 A1* | 8/2017 | El-Moussa | H04L 9/3226 |
| | | | 713/193 |
| 2017/0337140 A1* | 11/2017 | Ragupathi | G06F 12/1408 |

* cited by examiner

REMOTE SECURE DRIVE DISCOVERY AND ACCESS

TECHNICAL FIELD

The present disclosure relates in general to information handling systems and, more particularly, to systems and methods for remote management of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Until recently, many information handling systems used pre-OS (operating system), e.g., BIOS (basic I/O system) or UEFI (unified extensible firmware interface) utilities to unlock secure drives. This is a security problem since there are situations where malware (e.g., bootkits) can tamper with pre-OS environments, leading to locked drives and/or an unbootable system.

While it may be feasible to enable a baseboard management controller (BMC) to unlock local drives, BMCs may hang or otherwise become non-responsive, in which case, server boot could be affected and could result in I/O failures. In addition, servers that do not have a BMC may not be able to employ secure drives.

Historically, centralized key manager solutions have been used in the industry for remote management in large scale deployments. However, existing key manager solutions may require dedicated hardware hosted within the network. Dedicated resource requirements may lead to management overhead and increased operating expense including, without limitation, increased power consumption.

SUMMARY

In accordance with the teachings of the present disclosure, disadvantages and problems noted above are addressed using a messaging process to facilitate a BMC's discovery of I/O devices attached to remote servers. The disclosed messaging technique employs the payload of a packet that otherwise complies with a packet format standard. However, because the disclosed messaging does not constrain the content of the payload itself, any such message may be referred to herein as a vendor defined message (VDM). While described below with respect to remote discovery of storage controllers, the technique can be extended to other types of devices.

In accordance with disclosed subject matter, an information handling system includes a host system comprising a host processor, a host memory coupled to the host processor, and a local bus interface, which may be integrated in the host processor or included in a chip set coupled to the host processor. The local bus interface couples the host processor to a local bus, e.g., a peripheral component interconnect express (PCIe) local bus, sometimes referred to as a peripheral bus.

A local bus switch or peripheral bus switch coupled to the local bus includes a first port coupled to a BMC and a second port coupled to a network interface. The local bus switch may be, as an example, a PCIe switch. The network interface may be configured to couple a second port of the local bus switch to a local area network, e.g., an Ethernet network.

The BMC includes its own processor and memory for storing executable BMC instructions. The BMC may be configured to perform remote secure drive operations to discover and access a remote secure drive on a second server, irrespective of whether the second server includes a functional BMC.

The remote secure drive operations performed by the BMC may include receiving, from the local bus switch, a first VDM from the second server. The BMC may obtain, from a payload of the first VDM, identification information identifying the second server. The BMC may then send a second VDM to the second server. The second VDM may comprises an endpoint detection message for discovering peripheral resources of the second server.

The BMC may receive, from the second server, endpoint device information indicative of peripheral resources of the second server. The peripheral resources of the second server may include a storage controller associated with a secure drive. Responsive to determining that the second server's peripheral resources include a secure drive, the BMC may obtain key information associated with the secure drive from the payload of the first VDM. The key information may include, as an example, an encrypted password phrase. Upon decrypting or otherwise obtaining the key information for the remote secure drive, the BMC may then send the key information to the second server to access the secure drive.

Receiving the first VDM may include receiving, by a PCIe switch, the first VDM from a PCIe-to-Ethernet (ExpEther) interface coupling the PCIe switch to an Ethernet local area network. In this context, the VDM may be referred to as a PCIe VDM. For the sake of brevity, clarity, and generality, however, the term VDM may be used in lieu of PCIe VDM below and, unless expressly indicated otherwise, a VDM includes a PCIe VDM. Sending the second VDM may include generating, by the first BMC, a PCIe transaction layer packet (TLP), prepending a PCIe-to-Ethernet header to the TLP to form an ExpEther frame, and prepending an Ethernet header to the ExpEther frame to form an Ethernet frame. Prepending the Ethernet header may include prepending a media access control (MAC) address of the BMC and a MAC address of a PCIe-to-Ethernet network interface of the second server. One or more management component transport protocol (MCTP) messages may be used to determine whether the second server includes a secure drive.

The first server may represent a server designated as a primary key manager by an administrator or other user. Receiving the first VDM may comprise receiving the first VDM generated by a BMC of the second server. The second server may lack its own BMC and, in such cases, receiving the first VDM may comprise receiving the first VDM generated by a basic input/output system (BIOS) of the second server.

In other cases, the second server may represent the server originally designated as the primary key manager and the second server may include a BMC that may have been originally designated as a secondary key manager. In such cases, the primary server's BMC may have failed or otherwise become non-functional or unavailable and the receiving of the first VDM may correspond to a BIOS of the primary key manager sending the first VDM upon detecting that its BMC was not functional.

In accordance with disclosed subject matter, a secure drive access method includes receiving, by a BMC of a first server from a peripheral bus switch of the first server, a first message from a second server and obtaining, by the BMC, from a payload of the first message, identification information identifying the second server.

The method may further include receiving, from the second server, endpoint device information indicative of peripheral resources of the second server. The peripheral resources of the second server may include a storage controller associated with a secure drive. Responsive to determining that the endpoint devices include a secure drive, key information associated with the secure drive may be obtained from the payload of the first message. The secure drive key may then be sent to the second server to access the secure drive.

The peripheral bus switch of the first server may comprise a PCIe switch and receiving the first message may comprise receiving the first message from a network interface coupled to the peripheral bus switch. The network interface may comprise a PCIe-to-Ethernet interface coupling the PCIe switch to an Ethernet local area network.

The first message may be generated by and received from a BMC of the second server. In cases where the second server lacks a BMC or has a BMC that is non-functional, the first message may be generated by and received from a BIOS of the second server.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Disclosed subject matter, including disclosed VDMs, beneficially enables a remotely-located user to unlock secure drives even if the targeted system has no BMC or has a BMC that is non-responsive. The remote unlocking of secure drives can be beneficially invoked from any server on a network. This capability can be used by a BMC to emulate a centralized key manager.

FIGS. 1 through 6 illustrate three alternatives of networks and process flows that support and include the discovery and access of remote secure drives (RSDs), i.e., secure drives located on a different server. Each of the three alternatives is illustrated with a block diagram of platform components and resources and a flow diagram of an RSD process employed by the platform or by a server within the platform. For the sake of simplicity and clarity, each of the three scenarios is illustrated in the context of a platform that includes two servers. The illustrated platforms and process flows are applicable, however, to configurations that include an arbitrarily large number of servers.

Figure 1:
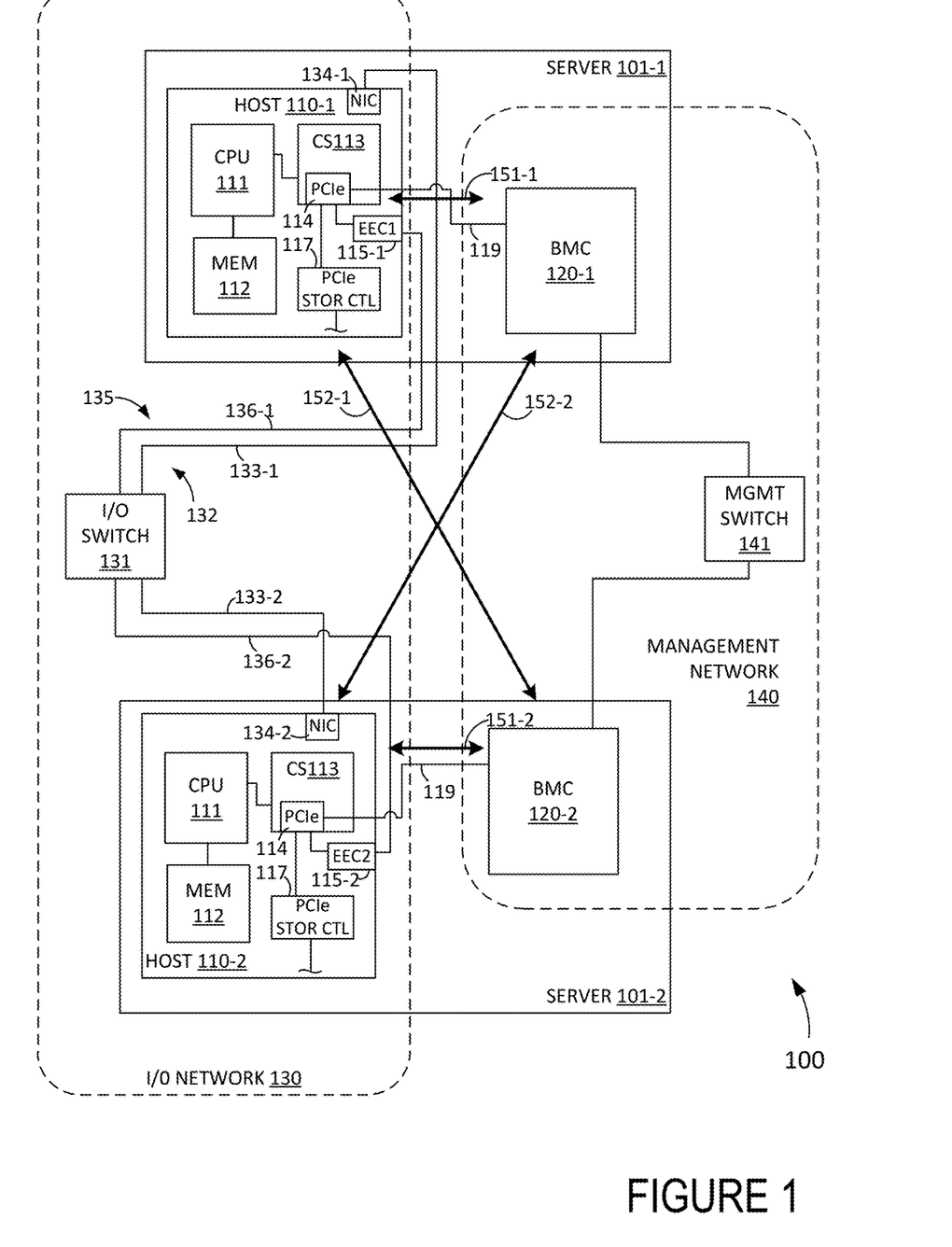
FIG. 1 illustrates a block diagram of an information handling system platform including two servers, each with its own functional BMC.

FIG. 1 illustrates an information handling system platform 100 suitable for enabling a server to discover and access a remote secure drive, i.e., a secure drive configured on a storage resource of a different network server. The information handling system platform 100 illustrated in FIG. 1 includes a first server 101-1 and a second server 101-2. Each server 101 includes a host 110 and a BMC 120. BMC 120 may comprise a service processor resource that includes its own processor (not depicted), runs its own firmware, and otherwise operates independent of host 110. BMC 120 may provide functionality that enables remote monitoring and management of its corresponding host 110. BMC 120 may communicate with one or more sensors (not depicted) on server 101 to monitor temperature, cooling fan speeds, power status, operating system (OS) status, and the like. BMC 120 may send alerts to a remotely located system administrator via a network interconnect if any parameters are non-compliant with a particular threshold. Each BMC 120 may include a baseline set of processing and communication resources that support a system management interface using Intelligent Management Platform Interface (IPMI) or another suitable system management protocol. Some embodiments of BMC 120 may include additional resources to provide more advanced system management interfaces including graphical interfaces. The BMC 120 may, in some embodiments, support the same or substantially the same features as a Dell™ Remote Assistant Card (DRAC) or an integrated Dell™ Remote Access Controller (iDRAC) from Dell, Inc.

Each of the hosts 110 illustrated in FIG. 1 includes one or more central processing units (CPUs) 111 coupled to a system memory 112 and a chip set 113. The chip set 113 illustrated in FIG. 1 includes an integrated PCIe switch 114 as well as one or more other peripheral bus interfaces (not explicitly depicted in FIG. 1). Although chipset 113 is illustrated in FIG. 1 as a single device, chip set 113 may encompass two or more devices. Conversely, while chip set 113 and PCIe switch 114 are illustrated as separate from CPU 111, features or functions of chip set 113, including PCIe switch 114, may be integrated into CPU 111.

The PCIe switch 114 illustrated in FIG. 1 is coupled to three PCIe endpoints including, BMC 120, a storage controller 117, and an ExpEther interface card (EEC) 115. EEC 115 enables an administrator to dynamically provision server 101 with "virtual PCIe" peripherals by hot-plugging or otherwise connecting, as an example, one or more PCIe storage resources to an Ethernet local area network (LAN) via ExpEther interfaces.

In at least one embodiment, platform 100 leverages PCI or PCI-like configuration and enumeration procedures in conjunction with Ethernet packet structure characteristics to employ ExpEther as a centralized key manager transport. Disclosed functionality for discovering and accessing RSDs may be achieved using UEFI/BIOS supported modules, thereby making the presence of a functional BMC on the remote system optional. The virtual extension of PCIe is supported by one or more connections between the hosts 110 and BMCs 120.

FIG. 1 illustrates information handling system platform 100 comprising two functionally distinct networks, an I/O network 130 and a management network 140. The I/O network 130 includes an I/O switch 131 that couples first host 110-1 to second host 110-2 via a standard LAN connection 132. The LAN connection 132 illustrated in FIG. 1 includes a first LAN interconnect 133-1 between I/O switch 131 and a network interface controller (NIC) 134-1 of first host 110-1 and a second LAN interconnect 133-2 between I/O switch 131 and a NIC 134-2 of second host 110-2. In the I/O network 130 illustrated in FIG. 1, I/O switch 131 also couples first host 110-1 to second host 110-2 via an ExpEther connection 135. The ExpEther connection 135 illustrated in FIG. 1 includes a first ExpEther interconnect 136-1 between I/O switch 131 and first EEC (EEC1) 115-1 and a second ExpEther connection 136-2 between I/O switch 131 and second EEC (EEC2) 115-2.

The information handling system platform 100 illustrated in FIG. 1 supports communication between I/O network resources and management network resources. In the context of resource discovery and initialization, the messages between I/O network resources and management network resources may include VDMs as disclosed herein. Each EEC 115, identified via class code or vendor identification, may appear as a PCIe switch to the corresponding host 110 and/or BMC 120. By interconnecting the EECs 115 of each server 101 via an ExpEther connection 135, each host 110 and each BMC 120, after initial enumeration/configuration, sees the other hosts 110 and other BMCs 120 as PCIe endpoints. More specifically, each BMC 120 sees the PCIe endpoints, including any PCIe storage controller endpoints, of the other hosts 110.

The information handling system platform 100 illustrated in FIG. 1 depicts VDM-over-PCIe (VDM/PCIe) communication paths 151 between each host 110 and its corresponding BMC 120 and VDM/ExpEther communication paths 152 between each host 110 and the BMC 120 of the other host 110 in information handling system platform 100.

Figure 2:
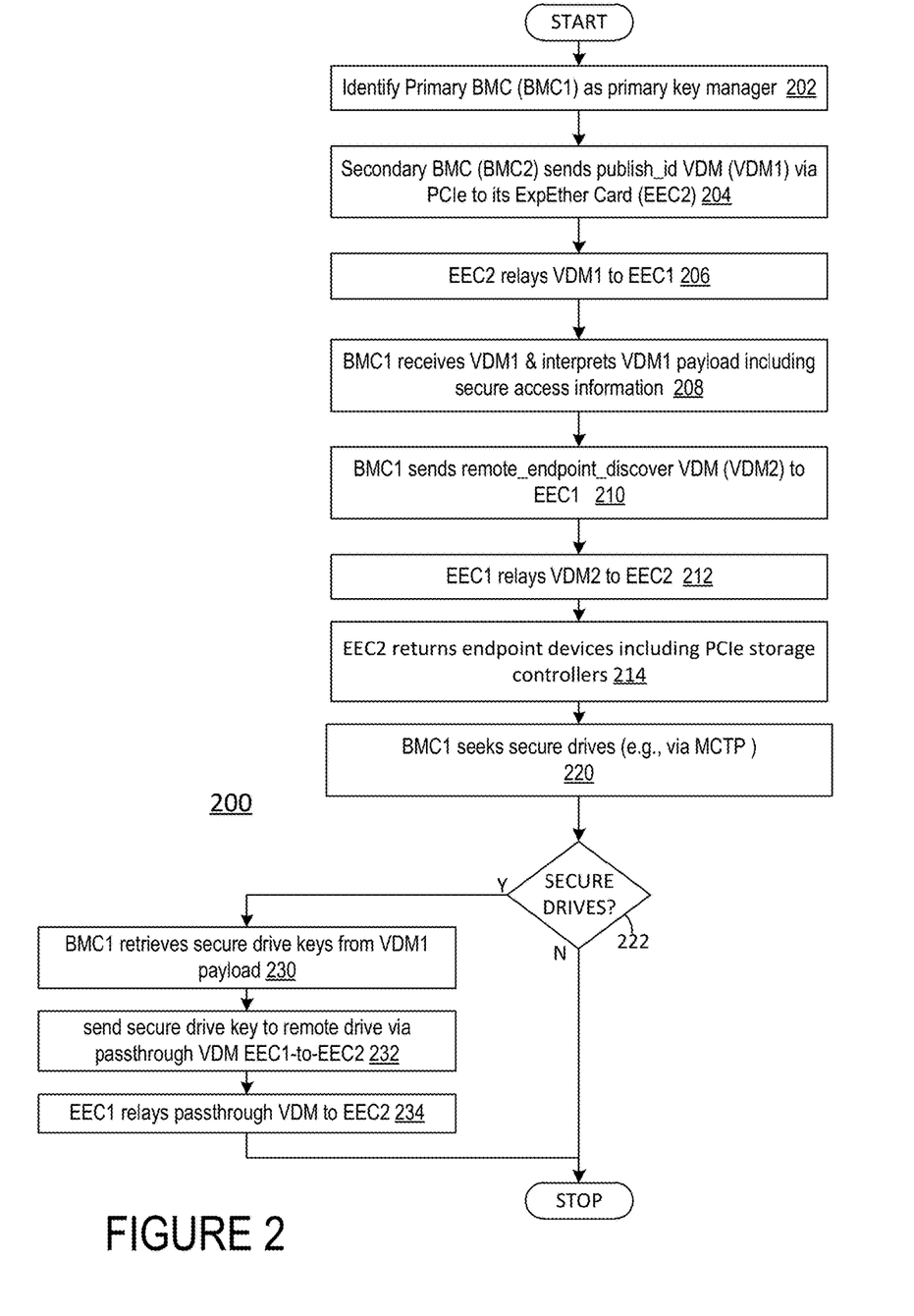
FIG. 2 illustrates a remote secure drive discovery and access process for the platform of FIG. 1.

FIG. 2 illustrates an RSD process 200 that may be performed by the two server network 100 of FIG. 1, in which first server 101-1 is assigned (block 202) as the primary key manager and second server 101-2 is assigned as a secondary key manager. The manner of assigning primary and secondary key manager responsibility is an implementation detail and may be made arbitrarily, performed manually, e.g., by a system administrator, or performed by an automated process.

In its secondary role, second BMC 120-2 sends (block 204) a publish_id VDM to EEC2 115-2 via second VDM/PCIe communication path 151-2. The publish_id VDM may include secure access information that may be used by the recipient to gain access to a remote secure drive. The secure access information may include any unique identifier such as service tag or MAC address of a storage controller or other resource on second host 110-2. In at least one embodiment, the publish_id VDM may include a PCIe packet encapsulated in an Ethernet frame as described in FIG. 7 below. The payload of the VDM packet may contain secure access information including, as a non-limiting example, an encrypted and/or proprietary password phrase. The EEC2 115-2 may relay (block 206) the publish_id VDM to EEC1 115-1 via second ExpEther communication path 152-2. The first BMC 120-1 may then receive (block 208) the publish_id VDM and decode or otherwise interpret the secure access information contained therein.

Subsequently, first BMC 120-1, in its role as primary key manager, may send (block 210) a proprietary remote_endpoint_discover VDM to EEC1 115-1 via VDM/PCIe communication path. The EEC1 115-1 relays (block 212) the remote_endpoint_discover VDM as a VDM/ExpEther communication to EEC2 115-2. The EEC2 115-2 then returns (block 214), to EEC1 115-1 and first BMC 120-1, connected device information indicating endpoint devices connected to EEC2 115-2. At this point, any storage controllers on second host 110-2 connected to EEC2 115-2 are visible to first BMC 120-1. Conversely, second BMC 120-2 can see storage controllers connected to first host 110-1.

Figure 8:
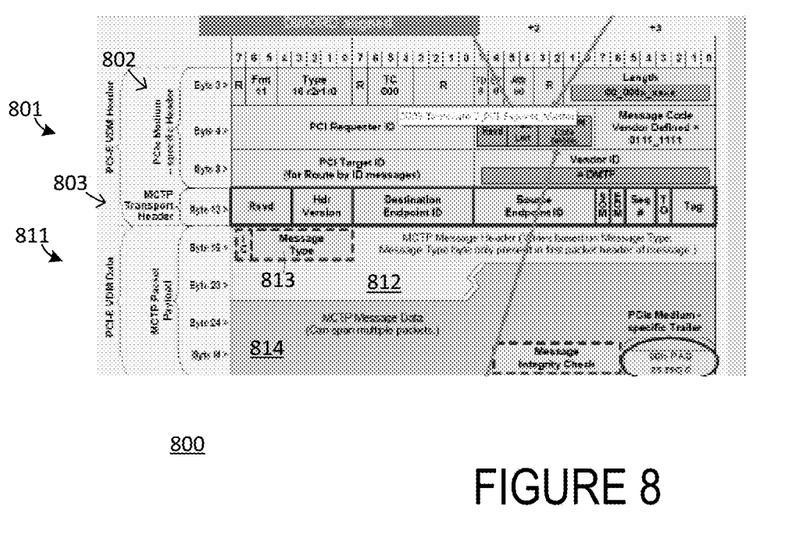
FIG. 8 illustrates additional detail of the virtual message of FIG. 7.

After the endpoint discovery of blocks 202 through 214 completes, first BMC 120-1 may (block 220) determine if any secure drives are connected to EEC2 115-2. In at least one embodiment, first BMC 120-1 may use existing management component transport protocol (MCTP) commands to identify secure drives. A representative MCTP packet structure is illustrated in FIG. 8 and discussed below. If (block 222) a secure drive is identified, first host 110-1 retrieves (block 230) the corresponding key and sends (block 232) the key in a passthrough VDM to EEC1 115-1. First EEC 115-1 may relay (block 234) the passthrough VDM to EEC2 115-2 and use it to unlock the local secure drive.

Figure 3:
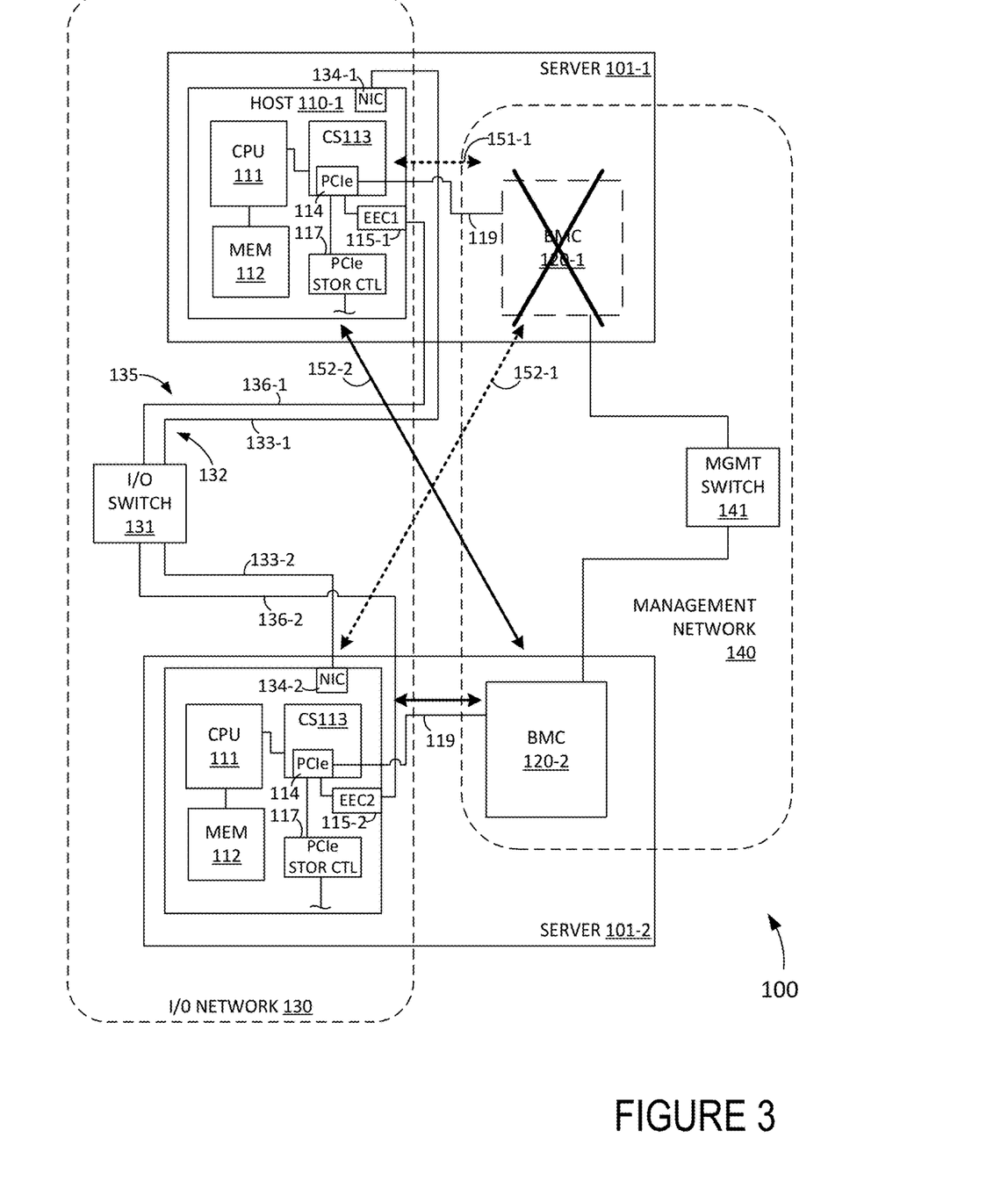
FIG. 3 illustrates a block diagram of an information handling system platform including two servers, each with its own BMC, one of which is non-functional.
Figure 4:
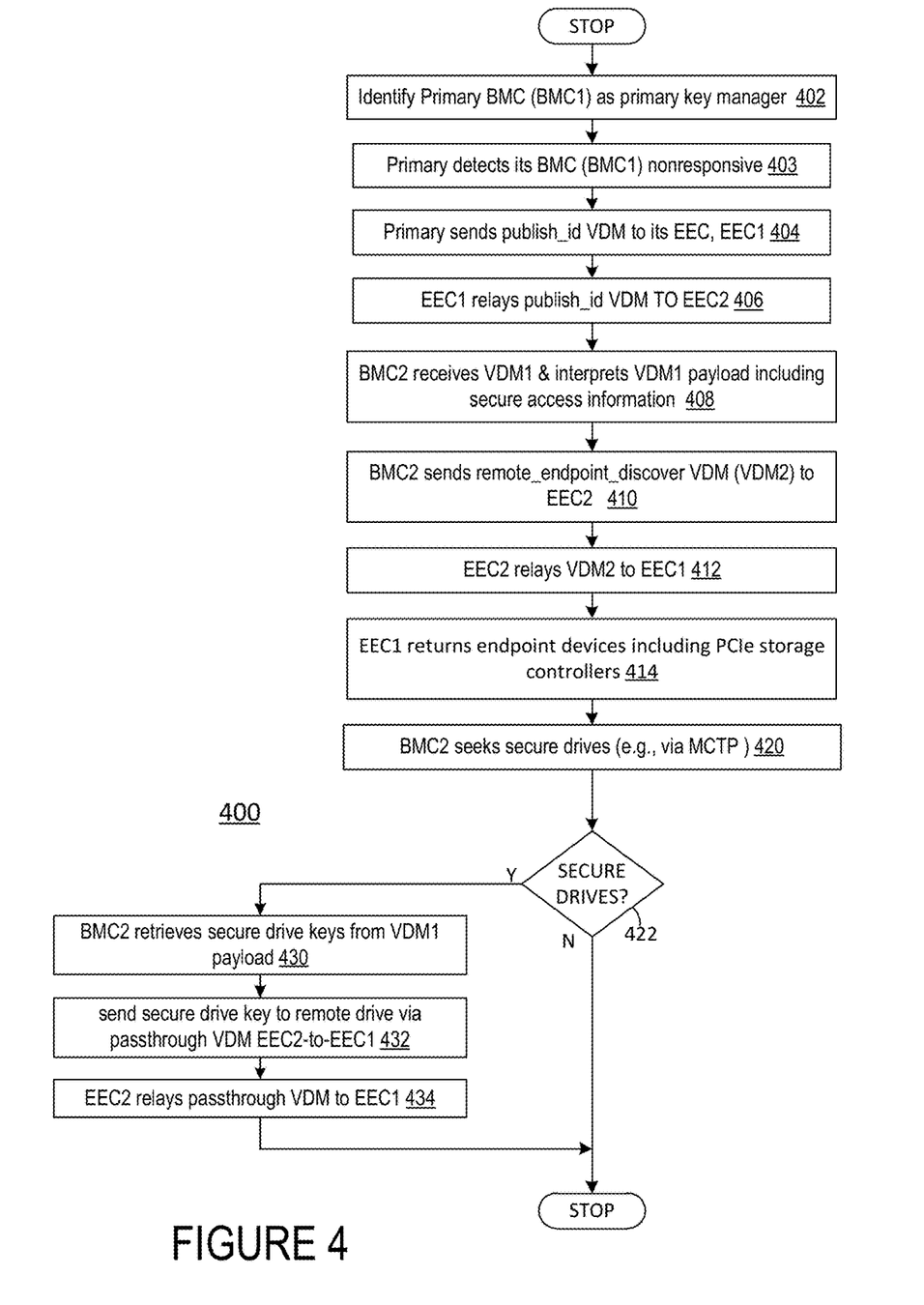
FIG. 4 illustrates a remote secure drive discovery and access process for the platform of FIG. 3.

Referring now to FIG. 3 and FIG. 4, an information handling system platform 100 substantially similar to the information handling system platform 100 illustrated in FIG. 1 is depicted in FIG. 3 in conjunction with a corresponding process 400 depicted in FIG. 4. In the information handling system platform 100 of FIG. 3, a first BMC 120-1 is present, but is non-responsive, or otherwise not functional. In the absence of a functional first BMC 120-1, the first VDM/PCIe communication path 151-1 and first VDM/ExpEther communication path 152-1 of FIG. 1 are no longer available, as represented in FIG. 3 by dotted lines, leaving second VDM/PCIe communication path 151-1 and second VDM/ExpEther communication path 152-2 as the remaining VDM communication paths.

FIG. 4 illustrates an RSD process 400 performed by information handling system platform 100 in the event of a primary key manager failure. As was the case for the process 200 of FIG. 2, the process 400 of FIG. 4 begins with the designation (block 402) of first BMC 120-1 as the primary key manager and second BMC 120-2 as the secondary key manager. In process 400, however, the first server 101-1 detects (block 403) that first BMC 120-1 is unresponsive or otherwise in a failed state.

In at least one embodiment, the failed state of first BMC 120-1 is detected by a BIOS of first server 101-1 that executes, at least in part, whenever first server 101-1 is powered on or reset. Upon determining that first BMC 120-1 is non-responsive, the first server 101-1 informs the second server 101-2 by sending (block 404) a publish_id VDM to its EEC1 115-1 via PCIe. The EEC1 115-1 relays (block 406) the publish_id VDM to EEC2 115-2. Like the publish_id VDM issued by second server 101-2 in the process 200 of FIG. 2, the payload of the publish_id VDM may include secure drive data. Again, the secure drive data may be in the form of a unique identifier, such as service tag, MAC address, of the secure drive.

Subsequent to block 406 in the process 400 of FIG. 4, the flow is analogous to the flow of process 200 in FIG. 2 from operation 208, with actions performed by the primary key manager in FIG. 2 being performed by the secondary key manager in FIG. 4. Accordingly, the process 400 illustrated in FIG. 4 includes second BMC 120-2 receiving (block 408) the publish_id VDM and decoding the secure access information contained therein. Subsequently, second BMC 120-2, in its role as secondary key manager when the primary key manager is non-responsive, sends (block 410) a proprietary remote_endpoint_discover VDM as a VDM/PCIe communication to EEC2 115-2.

The EEC2 115-2 relays (block 412) the remote_endpoint_discover VDM as a VDM/ExpEther communication to EEC1 115-1. The EEC1 115-1 then returns (block 414) to EEC2 115-2 and second BMC 120-2 connected device information indicating endpoint devices connected to EEC1 115-1. At this point, any storage controllers on second host 110-2 connected to EEC1 115-1 are visible to second BMC 120-2.

After the endpoint discovery of blocks 402 through 414 completes, second BMC 120-2 determines (block 420), using MCTP or another suitable protocol, whether any secure drives are connected to EEC1 115-1. If (block 422) a secure drive is identified, first host 110-1 retrieves (block 430) the corresponding key and sends (block 432) the key in a VDM passthrough message to EEC2 115-2. Second EEC 115-2 relays (block 434) the passthrough VDM to EEC1 115-1 and uses it to unlock the local secure drive.

Figure 5:
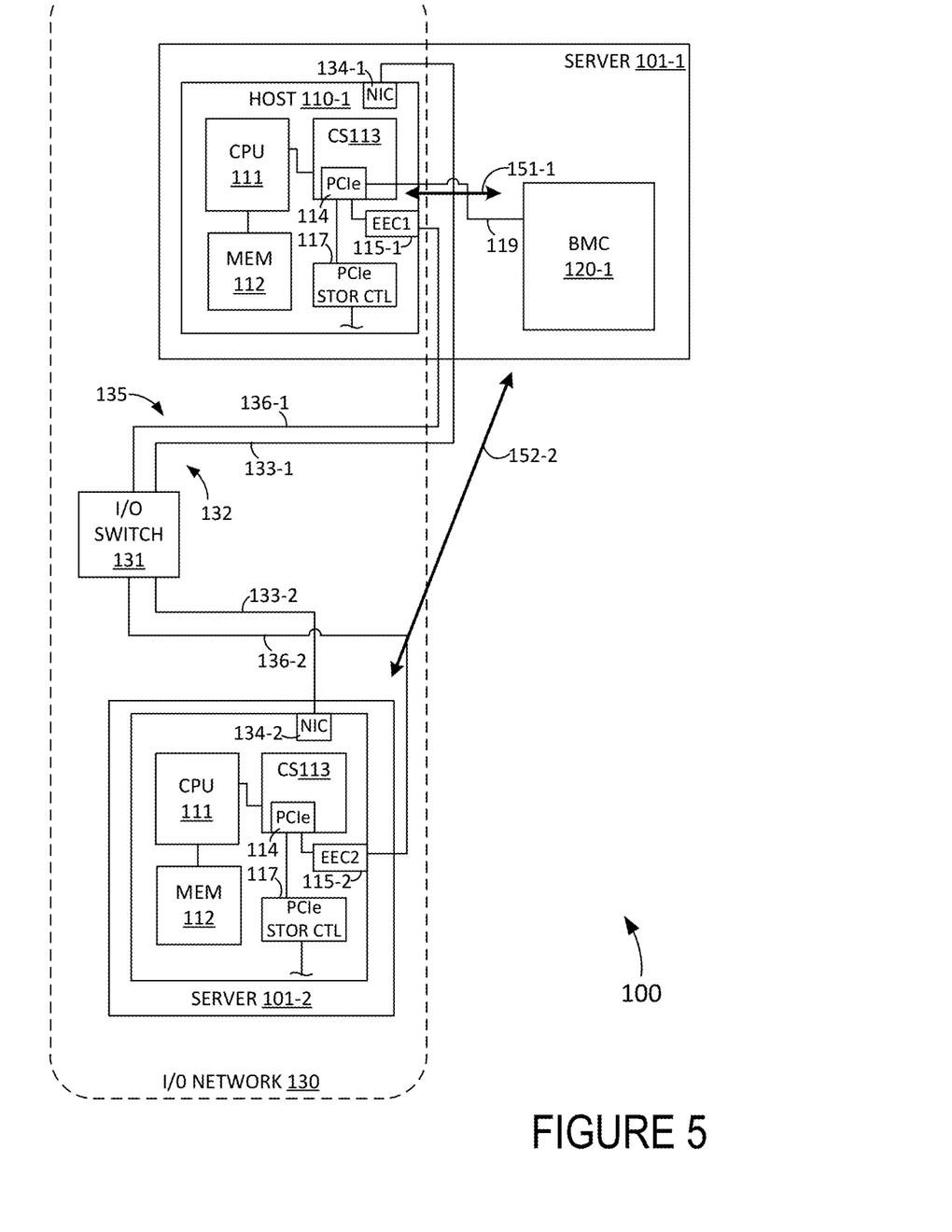
FIG. 5 illustrates a block diagram of an information handling system platform including two servers, only one of which includes a BMC.
Figure 6:
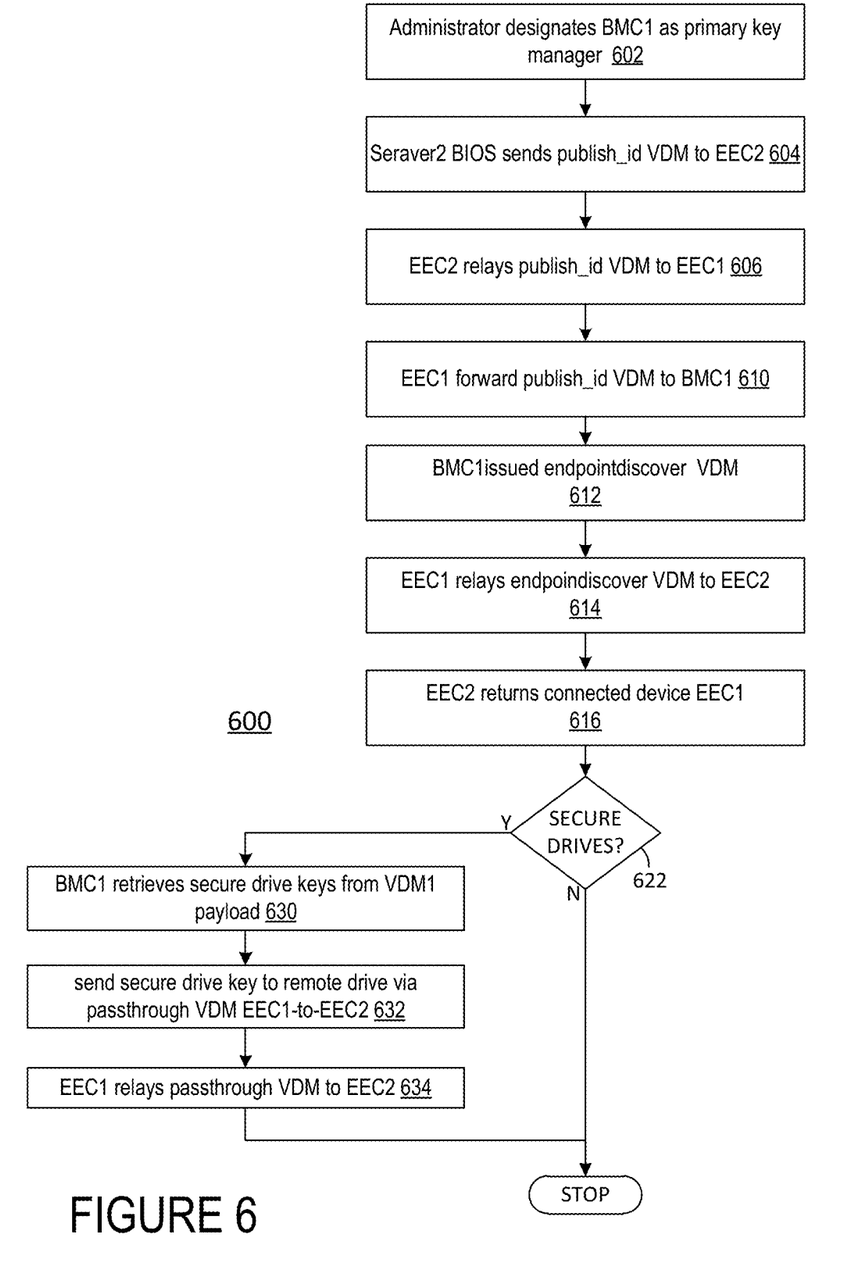
FIG. 6 illustrates a remote secure drive discovery and access process for the platform of FIG. 5.

Referring now to FIG. 5 and FIG. 6, a process 600 is illustrated for an information handling system platform 100 that includes two servers 101, one of which is equipped with a BMC 120 and the other of which is not. As depicted in FIG. 5, the first server 101-1 includes a BMC 120 while the second server 101-2 has no BMC. Thus, whereas the information handling system platform 100 shown in FIG. 1 and the information handling system platform 100 shown in FIG. 3 both include a management network 140, the information handling system platform 100 illustrated in FIG. 5 does not. The second server 101-2 does, however, include an EEC 115, which is shown coupled to EEC1 115-1 of first server 101-1 via an I/O switch 131 to form an ExpEther connection 135 in an I/O network 130.

The process 600 illustrated in FIG. 6 begins with an administrator designating (block 602) first BMC 120-1 as a primary key manager. The second server 101-2 sends (block 604), e.g., during execution of its BIOS, a publish_id VDM to its EEC2 115-2 via PCIe. The publish_id payload may contain any unique identifier of a secure drive including, as example, a service tag, MAC address etc.

The EEC2 115-2 relays (block 606) this VDM to EEC1 115-1, which forwards (block 610) to first BMC 120-1. The first BMC 120-1, after acknowledging the publish_id VDM, sends (block 612) a remote_endpoint_discover VDM to EEC1 115-1 via first PCIe communication path 151-1. The EEC1 115-1 relays (block 614) the remote_endpoint_discover VDM to EEC2 115-2 which returns (block 616) connected device information to EEC1 115-1, at which point first BMC 120-1 can perceive storage controllers connected to second server 101-2.

After discovering the endpoints of second server 101-2, first BMC 120-1 determines (block 222) if second server 101-2 includes any secure drives. If so, first BMC 120-1 retrieves (block 630) keys based on information in the payload of VDM. This secure key is then sent (block 632) to remote drive using a VDM passthrough message. The EEC1 115-1 relays (block 634) this VDM to EEC2 115-2 and uses it to unlock local secure drives.

Figure 7:
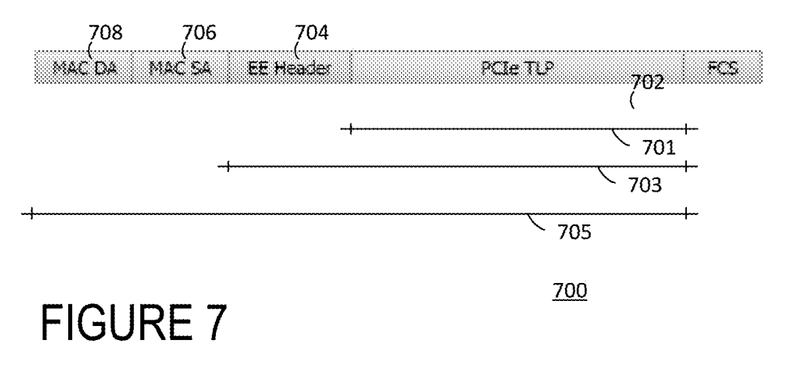
FIG. 7 illustrates an example virtual message.

FIG. 7 illustrates an example format and structure for a VDM 700. The illustrated VDM 700 comprises a PCIe packet 701 encapsulated within an ExpEther frame 703 encapsulated in an Ethernet frame 705. The PCIe packet 702 illustrated in FIG. 7 comprises a PCIe transaction layer packet (TLP), while the ExpEther frame 703 includes the PCIe TLP 702 and an ExpEther header 704. The Ethernet frame 705 includes the ExpEther frame 703, plus the MAC 706 of a sender and the MAC 708 of a recipient or destination.

FIG. 8 illustrates an example MCTP message 800 format. The PCIe TLP 702 of FIG. 8 includes a VDM header 801 and VDM data 811. The VDM header 801 includes 12 bytes (96 bits) of media-specific header information 802 and a 4 byte MCTP transport header 803. The VDM data 811 illustrated in FIG. 8 includes an MCTP packet payload of 16 bytes. The VDM data 811 includes an MCTP message header 812, which includes a message type field 813 and MCTP message data 814.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A secure drive access method comprising:
   receiving, by a baseboard management controller (BMC) of a first server from a peripheral bus switch of the first server, a first vendor defined message from a second server;
   obtaining, by the BMC, from a payload of the first vendor defined message, identification information identifying the second server;
   receiving, from the second server, endpoint device information indicative of endpoint devices of the second server, the endpoint devices of the second server including a storage controller;
   responsive to determining the endpoint devices include a secure drive associated with the storage controller, obtaining key information associated with the secure drive from the payload of the first vendor defined message; and
   sending the key information to the second server to access the secure drive.

2. The method of claim 1, wherein the peripheral bus switch of the first server comprises a peripheral component interconnect express (PCIe) switch.

3. The method of claim 1, further comprising:
   receiving, by the peripheral bus switch of the first server, the first vendor defined message from a network interface coupled to the peripheral bus switch.

4. The method of claim 3, wherein the peripheral bus switch comprises a peripheral component interconnect express (PCIe) switch and wherein the network interface comprises a PCIe/Ethernet interface coupling the PCIe switch to an Ethernet local area network.

5. The method of claim 1, wherein receiving the first vendor defined message comprises receiving the first vendor defined message from a BMC of the second server.

6. The method of claim 1, wherein receiving the first vendor defined message comprises receiving the first vendor defined message from a basic input/output system (BIOS) of the second server.

7. The method of claim 6, wherein the second server lacks a BMC.

8. The method of claim 6, wherein the first server comprises a secondary key manager designated by an administrator and wherein receiving the first vendor defined message comprises receiving a first vendor defined message generated by the second server responsive to the second server detecting its BMC in a non-functional state.

9. An information handling system, comprising:
   a host processor;
   a host memory coupled to the host processor;
   a chip set coupling the host processor to a peripheral switch;
   a network interface port configured to couple a second port of the peripheral switch to a local area network; and
   a baseboard management controller (BMC) coupled to a first port of the peripheral switch, wherein the BMC is configured to perform remote secure drive operations comprising:
      receiving, via the peripheral switch, a first vendor defined message from a second server;
      obtaining, from a payload of the first vendor defined message, identification information identifying the second server;
      sending, to the second server, an endpoint discover request message;
      receiving, from the second server, endpoint device information indicative of endpoint resources of the second server, the endpoint resources of the second server including a storage controller associated with a secure drive;
      obtaining key information associated with the secure drive from the payload of the first vendor defined message; and
      sending the key information to the second server to access the secure drive.

10. The information handling system of claim 9, wherein sending the endpoint discover request message comprises sending the endpoint discover request message via the peripheral switch.

11. The information handling system of claim 10, wherein the peripheral switch comprises a peripheral components interconnect express (PCIe) switch.

12. The information handling system of claim 11, further comprising a network interface coupled between the PCIe switch and a local area network, wherein the local area network comprises an Ethernet network and wherein the network interface comprises a PCIe/Ethernet interface.

13. An information handling system, comprising:
   a host system, comprising:
      a host processor;
      a host memory coupled to the host processor;
      a chip set coupling the host processor to a local bus switch; and
      a network interface port configured to couple a second port of the local bus switch to a local area network; and
   a baseboard management controller (RMC) coupled to a first port of the local bus switch, wherein the BMC is configured to perform remote secure drive operations comprising:
      receiving, by the BMC from the local bus switch, a first message from a second server;
      obtaining, by the BMC, from a payload of the first message, identification information identifying the second server;
      sending a second message to the second server, wherein the second message comprises an endpoint detection message;
      receiving, from the second server, endpoint device information indicative of endpoint resources of the second server, the endpoint resources of the second server including a storage controller associated with a secure drive;
      responsive to determining the endpoint resources include a secure drive, obtaining key information associated with the secure drive from the payload of the first message; and
      sending the key information to the second server to access the secure drive.

14. The information handling system of claim 13, wherein the local bus switch comprises a peripheral component interconnect express (PCIe) switch.

15. The information handling system of claim 13, wherein the operations include:
   receiving, by the local bus switch, the first message from a network interface coupled to the local bus switch, wherein the local bus switch comprises a peripheral component interconnect express (PCIe) switch and wherein the network interface comprises a PCIe/Ethernet interface coupling the PCIe switch to an Ethernet local area network.

16. The information handling system of claim 15, wherein sending the second message comprises:
  generating, by the BMC, a PCIe transaction layer packet;
  prepending a PCIe-to-Ethernet header to the transaction layer packet to form an ExpEther frame;
  prepending an Ethernet header to the ExpEther frame to form an Ethernet frame.

17. The information handling system of claim 16, wherein prepending the PCIe-to-Ethernet header comprises prepending:
  a media access control (MAC) address of the BMC; and
  a MAC address of a PCIe-to-Ethernet network interface of the second server.

18. The information handling system of claim 17, wherein the operations include:
  determining, via management component transport protocol messages, whether the second server includes a secure drive.

19. The information handling system of claim 13, wherein receiving the first message comprises receiving the first message generated by a BMC of the second server.

20. The information handling system of claim 13, wherein receiving the first message comprises receiving the first message generated by a basic input/output system (BIOS) of the second server.

* * * * *